US010027685B2

(12) United States Patent
Lee et al.

(10) Patent No.: US 10,027,685 B2
(45) Date of Patent: *Jul. 17, 2018

(54) SYSTEM FOR PROVIDING BEHAVIOR INFORMATION NOTIFICATION SERVICE AND METHOD FOR PROVIDING BEHAVIOR INFORMATION NOTIFICATION SERVICE

(71) Applicant: Samsung Electronics Co., Ltd, Gyeonggi-do (KR)

(72) Inventors: Ji Cheol Lee, Gyeonggi-do (KR); Jung Je Son, Gyeonggi-do (KR); Sung Ho Choi, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/362,800

(22) Filed: Nov. 28, 2016

(65) Prior Publication Data

US 2017/0085576 A1 Mar. 23, 2017

Related U.S. Application Data

(63) Continuation of application No. 14/370,735, filed as application No. PCT/KR2013/000017 on Jan. 3, 2013, now Pat. No. 9,537,874.

(30) Foreign Application Priority Data

Jan. 3, 2012 (KR) .......................... 10-2012-0000388

(51) Int. Cl.
*H04L 29/06* (2006.01)
*G06Q 10/10* (2012.01)
*G06Q 50/00* (2012.01)

(52) U.S. Cl.
CPC .......... *H04L 63/126* (2013.01); *G06Q 10/10* (2013.01); *G06Q 10/109* (2013.01); *G06Q 50/01* (2013.01); *H04L 63/107* (2013.01)

(58) Field of Classification Search
CPC ..... H04L 63/107; H04L 63/126; G06Q 50/01; G06Q 10/109; G06Q 10/10; G06C 30/02; G06C 50/01; G06C 50/32; G06C 30/00
See application file for complete search history.

(56) References Cited

U.S. PATENT DOCUMENTS 7,084,758 B1    8/2006  Cole
8,019,877 B2    9/2011  Li et al.
(Continued)

FOREIGN PATENT DOCUMENTS

EP           2395326 A2    12/2011
KR    10-2005-0009454      1/2005
(Continued)

OTHER PUBLICATIONS

International Search Report dated Apr. 3, 2013 in connection with International Patent Application No. PCT/KR2013/000017, 7 pages.
(Continued)

*Primary Examiner* — Don Zhao

(57) ABSTRACT

The present invention has the aim of providing a method of an activity information notification service in which a server can receive activity information from a user of a target terminal, depending on his or her privacy setting, and then transmit the received activity information to a selected receiving user, and in which any receiving user can transmit a notification request to a target user in order to receive desired activity information. According to an embodiment of the present invention, a method of an activity information notification service at a server, the method includes steps of receiving activity information from a target terminal; determining a receiving terminal to which the received activity
(Continued)

information will be transmitted, depending on a privacy setting of the target terminal stored in a storage unit; and transmitting the activity information to the determined receiving terminal.

20 Claims, 9 Drawing Sheets

(56) References Cited

U.S. PATENT DOCUMENTS

| | | | |
|---|---|---|---|
| 8,892,128 | B2 | 11/2014 | Gehrke et al. |
| 2001/0048745 | A1 | 12/2001 | Sheymov et al. |
| 2004/0207522 | A1 | 10/2004 | McGee et al. |
| 2004/0229632 | A1* | 11/2004 | Flynn .................. H04W 4/02 455/456.3 |
| 2005/0039136 | A1* | 2/2005 | Othmer ............ G06F 17/30905 715/774 |
| 2006/0058948 | A1* | 3/2006 | Blass ................ G01C 21/343 701/408 |
| 2007/0280269 | A1* | 12/2007 | Rosenberg ............ G06Q 30/02 370/399 |
| 2008/0032719 | A1* | 2/2008 | Rosenberg ............ G06Q 30/02 455/466 |
| 2008/0132252 | A1 | 6/2008 | Altman et al. |
| 2008/0248815 | A1* | 10/2008 | Busch .................. H04W 4/02 455/456.5 |
| 2008/0284587 | A1 | 11/2008 | Saigh et al. |
| 2009/0031006 | A1* | 1/2009 | Johnson ............. H04W 76/021 709/218 |
| 2009/0265471 | A1 | 10/2009 | Li et al. |
| 2010/0093371 | A1 | 4/2010 | Gehrke |
| 2010/0191578 | A1* | 7/2010 | Tran ...................... G06Q 30/02 705/26.7 |
| 2010/0250131 | A1 | 9/2010 | Relyea et al. |
| 2010/0306249 | A1* | 12/2010 | Hill .................. G06F 17/30867 707/769 |
| 2011/0016199 | A1 | 1/2011 | De Carlo et al. |
| 2011/0016514 | A1 | 1/2011 | De Carlo et al. |
| 2011/0083101 | A1 | 4/2011 | Sharon et al. |
| 2011/0300876 | A1 | 12/2011 | Lee et al. |
| 2012/0100869 | A1* | 4/2012 | Liang .................... H04W 4/02 455/456.1 |
| 2012/0170451 | A1 | 7/2012 | Viswanathan et al. |
| 2012/0286951 | A1* | 11/2012 | Hess .................... G08B 25/008 340/539.1 |
| 2012/0316896 | A1* | 12/2012 | Rahman ................ G06Q 50/24 705/3 |
| 2013/0117155 | A1* | 5/2013 | Glasgo .................. G06Q 30/00 705/26.35 |
| 2013/0268357 | A1* | 10/2013 | Heath .................... H04L 63/00 705/14.53 |
| 2013/0285855 | A1* | 10/2013 | Dupray .................. G01S 19/48 342/451 |

FOREIGN PATENT DOCUMENTS

| | | |
|---|---|---|
| KR | 10-2005-0098557 | 10/2005 |
| KR | 10-2007-0047454 | 5/2007 |
| KR | 10-0767065 | 10/2007 |
| KR | 10-2008-0043432 A | 5/2008 |
| KR | 10-2009-0013466 | 2/2009 |

OTHER PUBLICATIONS

Written Opinion of International Searching Authority dated Apr. 3, 2013 in connection with International Patent Application No. PCT/KR2013/000017, 6 pages.

Extended European Search Report dated Apr. 29, 2015 in connection with European Application No. 13733833.1, 8 pages.

Communication from a foreign patent office in a counterpart foreign application, Korean Intellectual Property Office, Office Action for Korean Application No. KR 10-2012-0000388, dated Mar. 20, 2018, 15 pages.

* cited by examiner

SYSTEM FOR PROVIDING BEHAVIOR INFORMATION NOTIFICATION SERVICE AND METHOD FOR PROVIDING BEHAVIOR INFORMATION NOTIFICATION SERVICE

CROSS-REFERENCE TO RELATED APPLICATIONS AND CLAIM OF PRIORITY

The present application is a continuation of U.S. patent application Ser. No. 14/370,735, filed on Jul. 3, 2014, which claims priority under 35 U.S.C. § 365 to International Patent Application No. PCT/KR2013/000017 filed Jan. 3, 2013, entitled "SYSTEM FOR PROVIDING BEHAVIOR INFORMATION NOTIFICATION SERVICE AND METHOD FOR PROVIDING BEHAVIOR INFORMATION NOTIFICATION SERVICE". International Patent Application No. PCT/KR2013/000017 claims priority under 35 U.S.C. § 365 and/or 35 U.S.C. § 119(e) to Korean Patent Application No. 10-2012-0000388 filed Jan. 3, 2012, and which are incorporated herein by reference into the present disclosure as if fully set forth herein.

TECHNICAL FIELD

The present invention relates to a notification service providing system and method for notifying activity information to a plurality of terminals used by users.

BACKGROUND ART

Normally a social network service (SNS) provided on a network has the ability to share information posted by users at a server. Sharing information with others may be performed through various acts such as writing something, uploading a photo or video, uploading a user's location, and the like.

In the social network service, it has been allowed to determine the range of information capable of being posted by a user and also to select receiving users, by ranking them as first-degree relationship, buddy, or the like, whom such information is opened to and shared with.

However, in this case, there has been a problem that it is disallowed to open the activity of a target of open or to request a target user to open his or her activity information.

DISCLOSURE OF INVENTION

Technical Problem

The present invention has the aim of providing a method of an activity information notification service in which a server can receive activity information from a user of a target terminal, depending on his or her privacy setting, and then transmit the received activity information to a selected receiving user, and in which any receiving user can transmit a notification request to a target user in order to receive desired activity information.

Solution to Problem

In order to achieve the above aim, according to an embodiment of the present invention, a method of an activity information notification service at a server includes steps of receiving activity information from a target terminal; determining a receiving terminal to which the received activity information will be transmitted, depending on a privacy setting of the target terminal stored in a storage unit; and transmitting the activity information to the determined receiving terminal.

According to an embodiment of the present invention, a server of an activity information notification service includes a receiver unit configured to receive activity information from a target terminal; a storage unit configured to store therein a privacy setting of the target terminal; a control unit configured to compare the stored privacy setting of the target terminal with the activity information received from the target terminal and thereby to determine a receiving terminal to which the activity information will be transmitted; and a transmitter unit configured to transmit the activity information to the determined receiving terminal.

According to an embodiment of the present invention, a terminal of an activity notification service includes an input unit configured to receive a notification request containing therein notification setting information; and a transceiver unit configured to transmit data containing therein the notification request and to receive the data.

According to an embodiment of the present invention, a method of an activity information notification service at a terminal includes steps of receiving, through an input unit, a notification request containing therein notification setting information; transmitting the notification request through a transceiver unit; receiving activity information of a target terminal from the server through the transceiver unit; and displaying the received target activity information through a display unit.

Advantageous Effects of Invention

According to an embodiment of the present invention, the convenience of users may be enhanced.

Additionally, a simple sharing of activity among users may be allowed in an SNS service.

Further, even though a target user conducts a target activity without any manipulation, it is possible to share activity information of the target user with a receiving user. This may promote user manipulability.

MODE FOR THE INVENTION

Hereinafter, an embodiment of the present invention will be fully described with reference to the accompanying drawings. The following description is provided to assist in a comprehensive understanding of various embodiments of the present invention as defined by the claims and their equivalents. It includes various specific details to assist in that understanding but these are to be regarded as merely exemplary.

Figure 1:
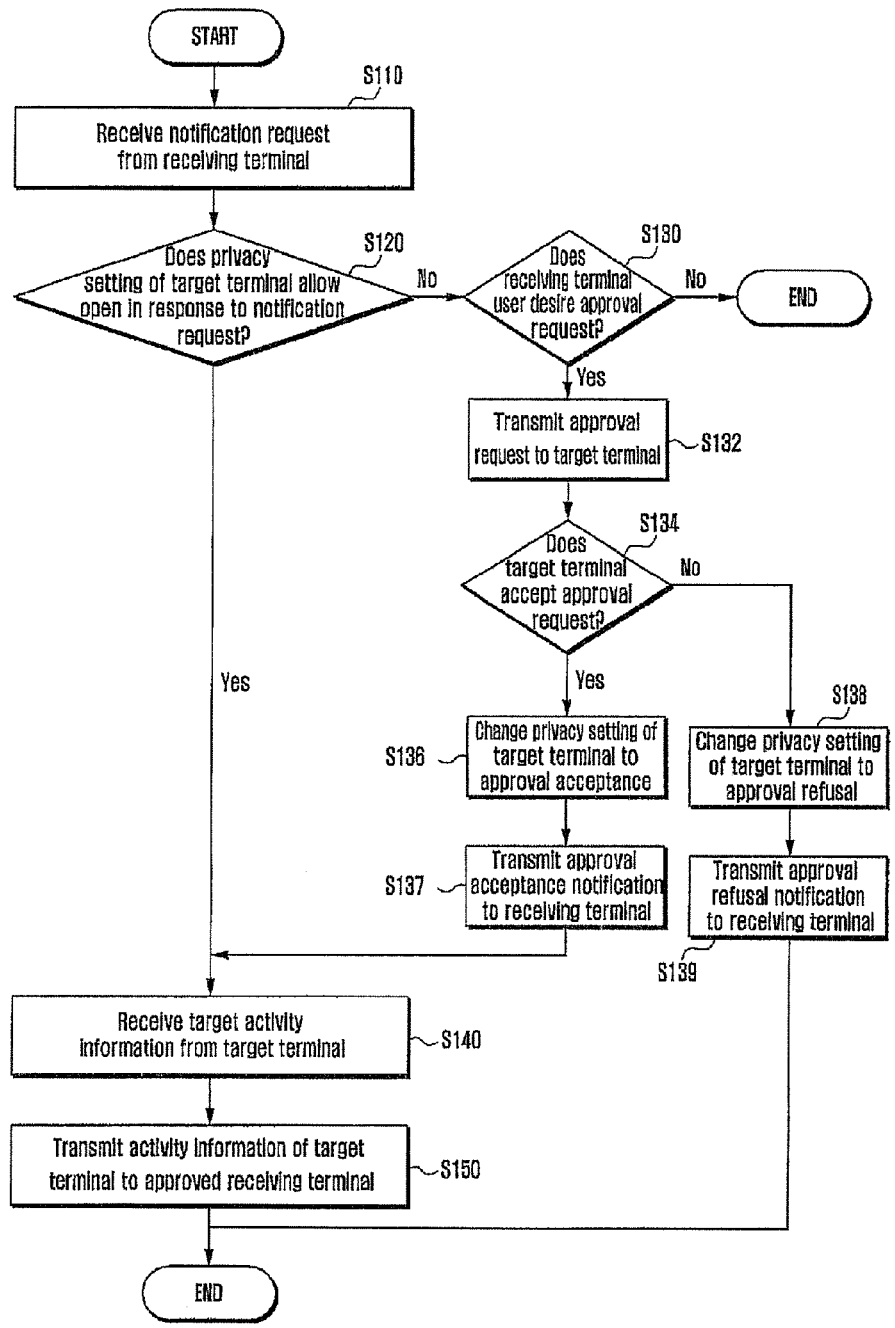
FIG. 1 is a flow diagram illustrating a method of a user activity notification service in accordance with an embodiment of the present invention.

FIG. 1 is a flow diagram illustrating a method of a user activity notification service in accordance with an embodiment of the present invention.

Referring to FIG. 1, at step 110, a notification request may be received from a receiving terminal of a receiving user. This notification request contains therein notification setting information.

The notification setting information may include one or more of information about a receiving terminal of a receiving user, information about a target terminal of a target user intended for a notification service, information about a target activity, information about a period of receiving an activity information notification of a target user, or information about whether to transmit an approval request to a target terminal.

Based on the notification setting information, a server can transmit activity information to the receiving terminal when the target activity of the target user is detected from the target terminal. The target activity may be represented as a behavior and a target. For example, the behavior may be a word for expressing an act such as 'arrive', 'depart', 'listen', 'cook', or the like, and the target may be indicated including information about specific location, music, food, or the like.

According to another embodiment, if the behavior and the target are not contents previously stored in the server, the behavior and the target may be stored. By storing the behavior and the target, it is possible to recommend specific contents frequently desired by the user of the receiving terminal or frequently conducted by the user of the target terminal. This may help a user's selection.

Additionally, the period information allows the notification to be sent to the receiving terminal only when the user of the target terminal conducts the target activity within the period. Therefore, there is no need to continuously detect the target activity of the target user, and also it is possible to prevent the activity of the target terminal user from being exposed during any undesired period.

Further, since the notification request contains therein any information about whether to transmit the approval request to the target terminal, the user of the receiving terminal can determine whether to transmit the approval request to the target terminal in case a privacy setting of the target terminal user is defined not to open the target activity to the user of the receiving terminal. Therefore, in case of need, the user of the receiving terminal can send the approval request to the target terminal. Another embodiment of the approval request will be described later.

At step 120, it is possible to determine, based on the received notification request, whether the privacy setting of the target terminal allows or not the open in response to the notification request.

The privacy setting allows the user of the target terminal to set up his or her target activity to be opened and/or the receiving user to whom the target activity will be opened through the server. For example, it is possible to set up the target activity for each receiving user to whom the user of the target terminal desires to open. This information may be determined for each terminal used by the receiving user. Also, information about a period of receiving an activity information notification of a target user may be set up.

More specifically, a certain target terminal user A1 may set up to notify information about all locations desired by a selected receiving terminal user A2 to the receiving terminal user A2 for one week. In case this period passed away, a system may be configured to automatically notify the receiving terminal user or the target terminal user to make again an approval request.

The privacy setting may be set up such that the target terminal user responds at an approval request step to be discussed below. Also, it is possible to previously set up both target activity, to be opened by the target terminal user, and the receiving terminal user through an additional privacy setting step.

At step 130, if the privacy setting of the target terminal disallows the open in response to the notification request, it is possible to determine whether the receiving terminal user desires to transmit an approval request to the target terminal.

If the receiving terminal user does not desire to transmit the approval request to the target terminal, the process is ended without any notification of target activity information. In this case, it is possible to transmit, to the receiving terminal, the fact that the target terminal user performs the privacy setting so as not to open the target activity to the receiving terminal user.

At step 132, if the receiving terminal user desires to transmit the approval request to the target terminal, the approval request may be transmitted to the target terminal.

The approval request may contain therein one or more of receiving terminal user information, target activity information, or period information. For example, the approval request may be made to obtain approval for a certain receiving terminal user B1 to receive today a notification about leaving an office located at B2. Another embodiment will be described later.

At step 134, it is possible to determine whether the transmitted approval request is accepted by the target terminal user. Acceptance or not may be made through the target terminal.

At step 136, if any data for accepting the approval request is received from the target terminal, the privacy setting of the target terminal user may be changed. The changed privacy setting may be stored in the form of allowing the receiving terminal user to be informed about the target activity of the target terminal user for the specific period. In case this period passed away, it may be allowed to send a notification about the lapse of the period to one or more of the receiving terminal user or the target terminal user.

At step 137, it is possible to transmit an approval acceptance notification of accepting the approval request to the receiving terminal. The approval acceptance notification may be formed of a message having the contents that the target terminal user has accepted the notification request.

If it is determined at step 134 that the approval request is refused by the target terminal user, the privacy setting of the target terminal user may be changed to a refusal at step 138.

In most cases, since the privacy setting of the target terminal user has been already defined not to open the activity information of the target terminal user to the receiving user, no change of the privacy setting may happen.

At step 139, it is possible to transmit an approval refusal notification of the target terminal user to the receiving terminal. In this case, the receiving terminal may display thereon a reception refusal notification.

At step 120, in response to the notification request, the privacy setting of the target terminal user may proceed without any change thereof.

At step 140, it is possible to receive the target activity information of the user from the target terminal. The target activity information may be information about the target activity of the target terminal user for whom the receiving terminal user performs the notification request. In this case, since the target activity information corresponds to information specified by the notification request of the receiving terminal user, additional step of transmitting a notification about the occurrence of the target activity information of the target terminal user to the receiving terminal selected by the privacy setting of the target user may be further included.

In another example, although there is no notification request of the receiving terminal user, if the target activity information of the target terminal user is received, a list of the receiving terminal users desiring the open of the received information may be extracted from the privacy setting of the target terminal user. Therefore, this example is within the scope of the present invention.

Figure 2:
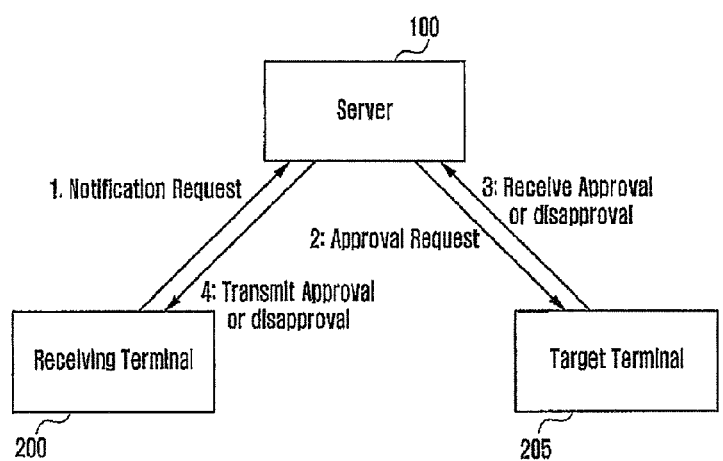
FIG. 2 is a diagram illustrating a data flow caused by a notification request in a user activity notification service in accordance with an embodiment of the present invention.
Figure 3:
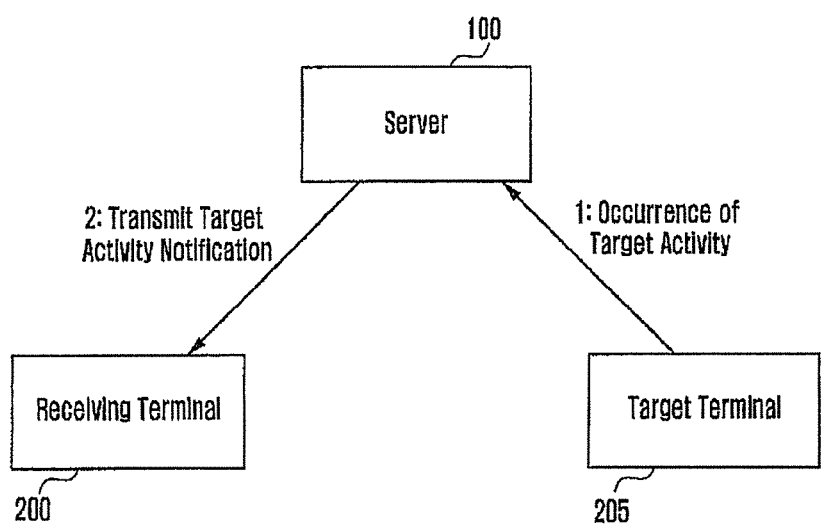
FIG. 3 is a diagram illustrating a data flow caused by a target user's activity in a user activity notification service in accordance with an embodiment of the present invention.

FIG. 2 is a diagram illustrating a data flow caused by a notification request in a user activity notification service in accordance with an embodiment of the present invention. FIG. 3 is a diagram illustrating a data flow caused by a target user's activity in a user activity notification service in accordance with an embodiment of the present invention.

Referring to FIGS. 2 and 3, this embodiment may include a server 100, a receiving terminal 200, and a target terminal 205. The server 100 may be offered in the form of allowing transmission or reception of data to or from the receiving terminal 200 and the target terminal 205.

The receiving terminal 200 and the target terminal 205 are conceptually named in connection with the notification request, but may be actually realized in the same form of terminal.

The user of the receiving terminal 200 may transmit a notification request to the server 100. The notification request may include notification setting information, which may include one or more of information about the user of the receiving terminal, information about the user of the target terminal intended for a notification service, information about a target activity, information about a period of receiving an activity information notification of the user of the target terminal, or information about whether to transmit an approval request to the user of the target terminal.

The server 100 may compare the received notification request with a privacy setting of the target terminal user and thereby determine whether the target user opens or not the target activity to the user of the receiving terminal. If the user of the target terminal does not desire to open it and if the user of the receiving terminal sends the notification request so as to request an approval from the target terminal, the server may transmit the approval request to the user of the target terminal.

In response to the approval request, the user of the target terminal 205 may transmit approval or disapproval to the server 100. Depending on the received approval or disapproval, the server 100 may change the privacy setting of the target terminal. Additionally, the server may transmit such approval or disapproval to the receiving terminal 200.

Also, the server 100 may receive the contents of the target activity conducted by the target terminal user from the target terminal 205. The target terminal 205 may have an activity detector and, by detecting any activity of the target terminal user through the activity detector, transmit the occurrence of target activity to the server 100 without any input from the target terminal user. In another embodiment, such transmission to the server 100 may be made through additional input from the target terminal user.

Although there is no notification request, to transmit the occurrence of the target activity from the target terminal 205 to the server 100 may be performed when there is any target activity of the target terminal user at the target terminal 205.

The server 100 may compare the received target activity of the target terminal user with the privacy setting stored in the server 100. Then the server may extract a list of the receiving terminal users for opening the target activity and transmit a notification of the target activity to the receiving terminal 200.

In still another embodiment, if any target activity of the target terminal user is allowed for open by the privacy setting previously compared in response to the notification request of the receiving terminal user, the occurrence of the target activity may be transmitted to the receiving terminal 200 immediately at the occurrence of the target activity without additional comparison.

The receiving terminal 200 may notify the receiving terminal user of the occurrence of the target activity by displaying the received target activity notification.

Figure 4:
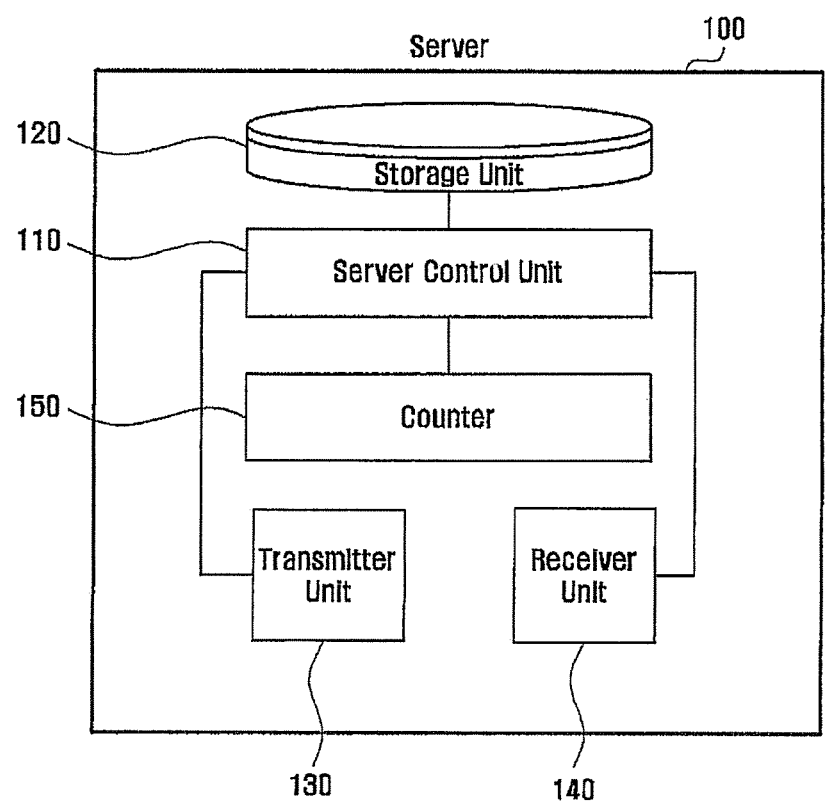
FIG. 4 is a diagram illustrating the configuration of a server in a user activity notification service in accordance with an embodiment of the present invention.

FIG. 4 is a diagram illustrating the configuration of a server in a user activity notification service in accordance with an embodiment of the present invention.

Referring to FIG. 4, the server 100 may include a server control unit 110, a storage unit 120, a transmitter unit 130, a receiver unit 140, and a counter 150. The server control unit 110 may compare a privacy setting of a target terminal user stored in the storage unit 120 with a notification request of a receiving user received through the receiver unit 140.

Depending on comparison results, an approval request may be transmitted to a target terminal through transmitter unit 130.

Additionally, the target activity information of the target terminal user received through the receiver unit 140 may be compared with the privacy setting of the target terminal user stored in the storage unit 120, and depending on comparison results, the target activity information of the target terminal user may be transmitted through the transmitter unit 130.

Additionally, the storage unit 120 may store therein target activity contained in the notification request of the receiving terminal user, and information about a period capable of receiving the activity information notification of the target terminal user. More specifically, behavior and target constituting the target activity may be stored, which may be effectively utilized for recommending the target activity to the target terminal user or the receiving terminal user on the basis of the frequency of already requested information when the notification request is made later.

Additionally, the counter 150 may check whether a given time has elapsed. Therefore, if the target activity corresponding to the notification request is received from the target terminal for a given time defined by the period information received through the notification request, the received target activity may be transmitted to the receiving terminal user.

Figure 5:
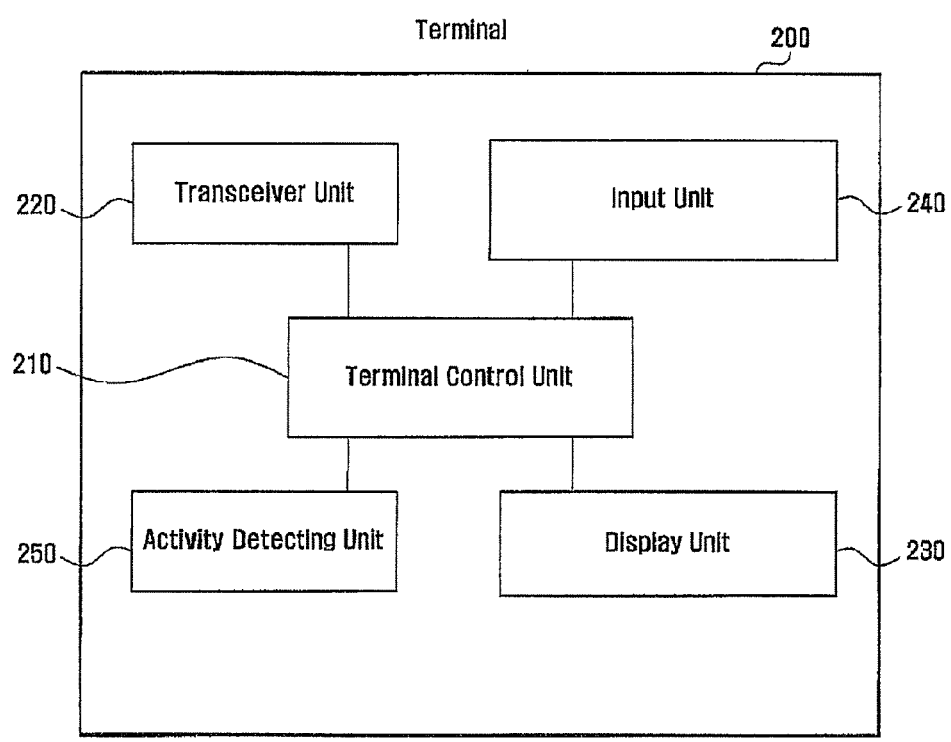
FIG. 5 is a diagram illustrating the configuration of a terminal in a user activity notification service in accordance with an embodiment of the present invention.

FIG. 5 is a diagram illustrating the configuration of a terminal in a user activity notification service in accordance with an embodiment of the present invention.

Referring to FIG. 5, a user terminal 200 may include a terminal control unit 210, a transceiver unit 220, a display unit 230, an input unit 240, and an activity detecting unit 250.

The terminal control unit 210 may analyze an input entered through the input unit 240 and information received through the transceiver unit 220 and may display such results on the display unit 230. More specifically, the user of the receiving terminal may enter the notification request through the input unit 240.

The terminal control unit 210 may analyze information such as the contents of the notification request, relevant time, or the like, and then transmit the notification request through the transceiver unit 220.

Additionally, the terminal control unit 210 may analyze the approval request received through the transceiver unit 220 or the activity information of the target user, and then display associated information through the display unit 230.

Also, if there is any target activity of the target terminal user detected through the activity detecting unit 250, the terminal control unit 210 may analyze the target activity and then transmit the time and detailed contents of the target activity through the transceiver unit.

The activity detecting unit 250 may detect whether any activity of the target terminal user occurs at the terminal. For example, location information such as the departure or arrival of the target terminal user from or at a specific location may be detected. Additionally, in case music is played through the terminal, information about such music, a playing time of such music, and the like may be detected. Also, in case of internet search through the terminal, information about search contents may be detected.

Additionally, although not shown, a terminal storage unit may be further included, and the terminal control unit 210 may store input or output data in the terminal storage unit.

Figure 6:
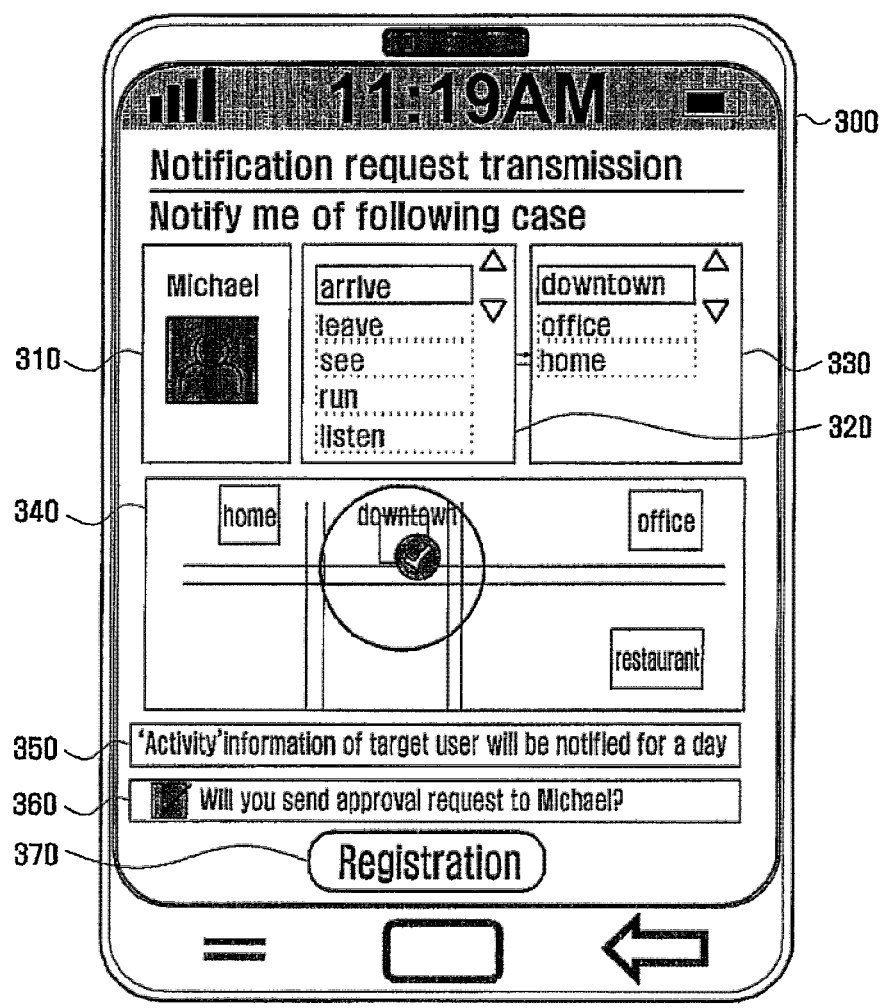
FIG. 6 is a diagram illustrating a UI on a display unit of a terminal at transmission of a notification request in accordance with an embodiment of the present invention.

FIG. 6 is a diagram illustrating a UI (User Interface) on a display unit of a terminal at transmission of a notification request in accordance with an embodiment of the present invention.

Referring to FIG. 6, the notification request UI 300 may be displayed through the display unit when the receiving user terminal receives information about the target terminal user and the target activity. The notification request UI 300 may contain one or more of a user selecting section 310 used for selecting the target terminal user, an activity selecting section 320 used for selecting the target activity, a target selecting section 330 used for selecting the target of the target activity, an assistant information section 340 used for offering reference information for the selection of the target activity, a period selecting section 350 used for selecting the period of the target activity notification, an approval request selecting section 360 used for determining whether to transmit the approval request to the target terminal when the privacy setting of the target user is not defined to open for the notification request, or a registration button 370 used for transmitting the notification request.

Any contents in the UI may be selected in a list recommended by the terminal. If there is no contents desired by the user in the recommended list, the user may directly enter text to select desired contents.

In this embodiment, the assistant information section 340 may show a current user location since the target activity relates to location. In another embodiment, in case the target activity relates to listening of a certain song C, singer information or popularity about the song C or information about selling houses of the song C may be displayed.

Figure 7:
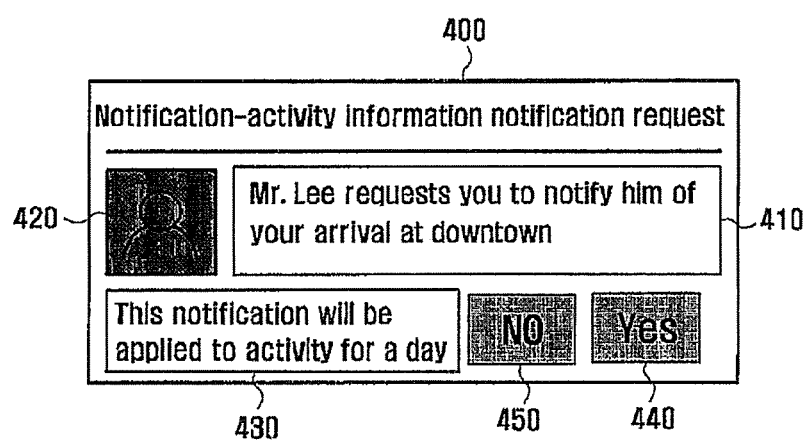
FIG. 7 is a diagram illustrating a UI on a display unit of a terminal at transmission of an approval request in accordance with an embodiment of the present invention.

FIG. 7 is a diagram illustrating a UI on a display unit of a terminal at transmission of an approval request in accordance with an embodiment of the present invention.

Referring to FIG. 7, an approval request UI 400 may indicate a target activity information section 410 used for showing information about the receiving terminal user and the contents of the target activity, a receiving user information section 420 used for showing a photo or name of the receiving user, a period display section 430 used for showing a period for which the target activity will be notified, a yes button 440 used for accepting the approval request, and a no button 450 used for refusing the approval request.

In case there is the approval request, the approval request UI 400 may be offered through the display unit of the target terminal, and whether to accept or refuse the approval request may be transmitted to the server through an input of the target terminal user.

Figure 8:
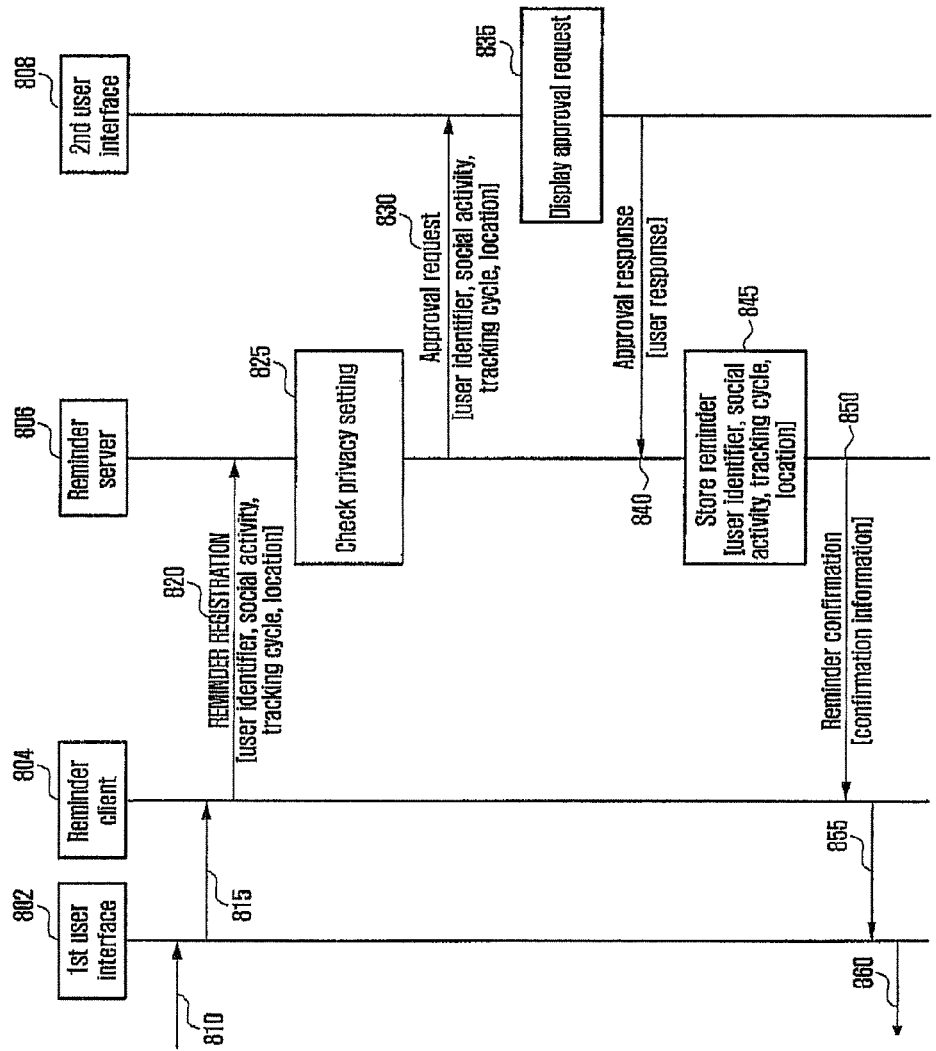
FIG. 8 is a diagram illustrating a signal flow between a terminal transmitting an approval request and a server in accordance with an embodiment of the present invention.

FIG. 8 is a diagram illustrating a signal flow between a terminal transmitting an approval request and a server in accordance with an embodiment of the present invention.

Referring to FIG. 8, the signal flow between the terminal and the server may be made to deliver a reminder registration among a first user interface 802, a reminder client 804, a reminder server 806, and a second user interface 808.

Each of the first and second user interfaces 802 and 808 may receive an input signal from each user and display data-based screen to the user. Also, depending on embodiments, each of the first and second user interfaces 802 and 808 may be realized at the terminal.

The reminder client 804 may transmit or receive data to or from the first user interface 802, perform determination on the basis of such data, and transmit or receive data to or from the reminder server 806. Depending on embodiments, the reminder client 804 may be realized at the terminal together with the user interface or in the form of application installed at the terminal.

The reminder server 806 may receive data from the user, store the received data therein, and perform determination on the basis of the received data. In an embodiment, the reminder server 806 may store the privacy setting therein and transmit a reminder confirmation to the user according to the privacy setting.

At step 810, the first user interface 802 may receive an input for registering a reminder from the user. In an embodiment, the user may enter information required for reminder registration through the first user interface 802. This information for the reminder registration may include one or more of a counterpart user ID, a social activity type, a tracking period for a reminder, and a location, depending on embodiments. This location may include one or more of the location of the first user and the location of the second user, and the reminder may be carried out on the basis of the location.

At step 815, the first user interface 802 may deliver the input received at step 810 to the reminder client 804.

At step 820, the reminder client 804 may deliver the reminder registration to the reminder server 806. The reminder registration may include one or more of a user identifier, a social activity type, a tracking period, and location information. The user identifier may include the identifier of a target user of a reminder and the identifier of a user to receive the remainder.

At step 825, the reminder server 806 may check a privacy setting on the basis of the information received at step 820. Depending on embodiments, the reminder server 806 may check the privacy setting of the second user, who is a target of a reminder, and thereby check whether it has been allowed to share a social activity with the first user to receive the reminder. If it is set up that the second user allows a sharing of the social activity requested by the first user, it may proceed directly to step 850. If it is set up that the second user disallows a sharing of the social activity requested by the first user, or if there is no setting, the reminder server 806 may transmit an approval request to the second user interface 808 at step 830. This approval request may include one or more of the social activity, the tracking period, and the first user ID received at step 820. Also, depending on embodiments, the second user interface may receive data from the reminder server 806 through a separate reminder client.

At step 835, the second user interface 808 may display the approval request on the basis of the information received at step 830. Depending on embodiments, one or more of the first user ID, the social activity type requested by the first user, and the tracking period of the social activity requested by the first user, received at step 830, may be displayed. Additionally, the second user may determine whether to accept the approval request and enter it through the second user interface.

At step 840, the second user interface 808 may transmit an approval response to the reminder server 806. This approval response may include a response entered by the second user.

At step 845, the reminder server may store therein one or more of the first user ID, the second user ID, the social activity, the tracking period, and the location, based on the approval response received at step 840.

At step 850, the reminder server 806 may transmit a reminder confirmation to the reminder client 804. This reminder confirmation may include acceptance or refusal of the second user in response to the reminder request by the first user.

The reminder client may transmit the reminder confirmation, received at step 850, to the first user interface 802 at step 855, and at step 860 the first user interface 802 may display the reminder confirmation information to the first user on the basis of the information received at step 855.

Figure 9:
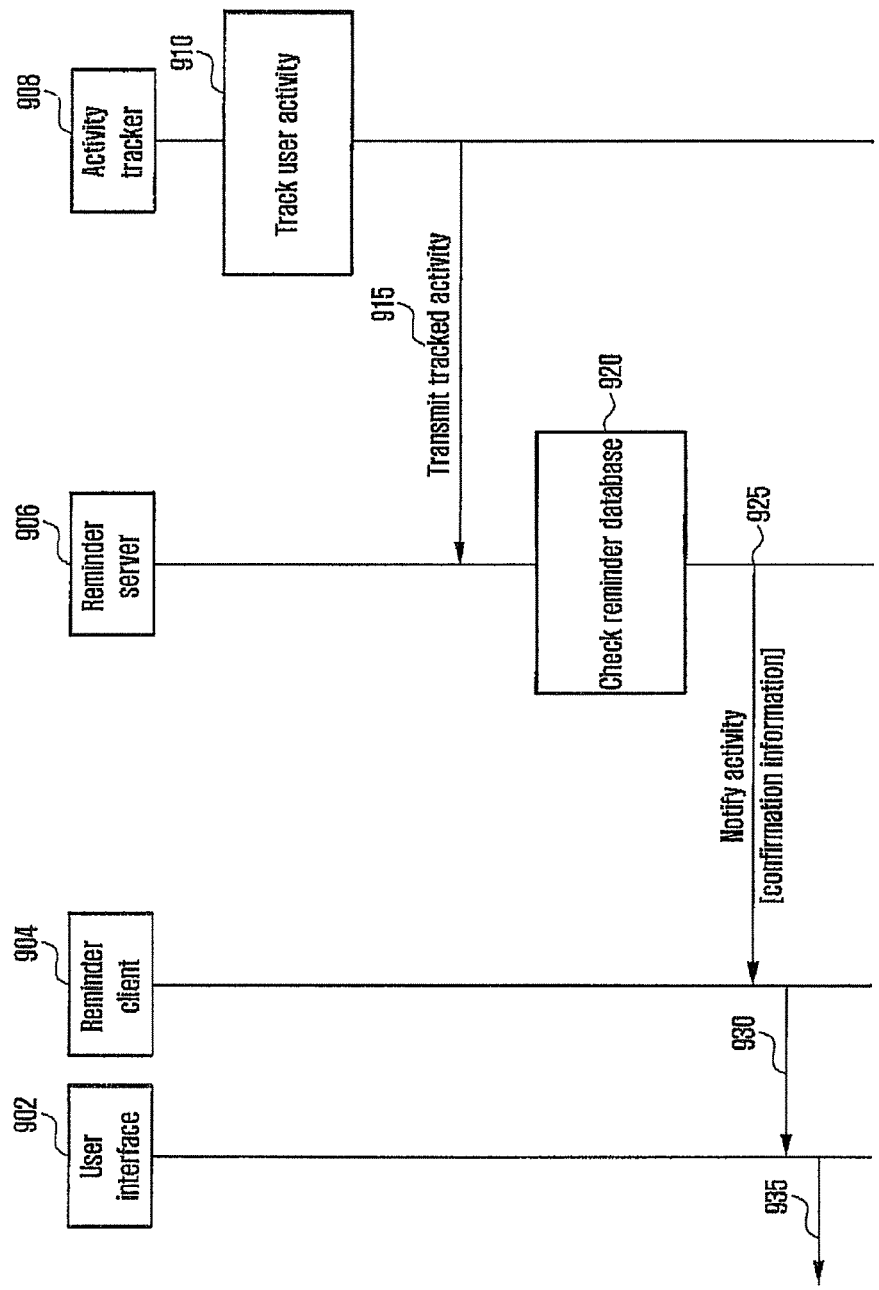
FIG. 9 is a diagram illustrating a signal flow among an activity tracker, a server and a user terminal.

FIG. 9 is a diagram illustrating a signal flow among an activity tracker, a server and a user terminal.

Referring to FIG. 9, the signal flow may be made among elements including one of more of a user interface 902, a reminder client 904, a reminder server 906, and an activity tracker 908. Depending on embodiments, the activity tracker 908 may be formed together with the reminder server 906.

This embodiment may show an activity tracking process in case a specific user requests a tracking of a social activity of any other user and then the other user accepts the request of the specific user. Also, in this embodiment, the social activity may be described as a user activity and include a user's movement, enjoying contents such as music or movie, and the like.

At step 910, the activity tracker 908 may detect the social activity of other user. Depending on embodiments, the activity tracker may include therein a location sensor configured for detection. If the location sensor detects any movement of other user, and if the movement is an activity requiring the tracking, the social activity may be detected. Also, a specific social activity of other user may be detected through an application used by that user. And also, depending on embodiments, the activity tracker may detect all detectable activities from among the social activity of other user.

At step 915, the activity tracker 908 may transmit information about the detected social activity to the reminder server 906. The social activity information may contain one or more of other user ID, the detected social activity, an occurrence time, and an occurrence location.

At step 920, by checking database, the reminder server 906 may determine one or more of whether the specific user has set up to track the social activity of the other user received at step 915 and whether the other user has accepted tracking.

If it is set up to notify the social activity of the other user, the reminder server 906 may transmit an activity notification to the reminder client 904 at step 925. The activity notification may include the information received at step 915. Additionally, if it is not set up to notify the social activity of the other user, no notification may be transmitted to the specific user.

The reminder client 904 may transmit the information, received at step 925, to the user interface 902 at step 930, and at step 935 the user interface 902 may offer the user the information received at step 930. Depending on embodiments, one or more of a screen display, a sound output, and a vibration generation may be offered to the user.

While the present invention has been particularly shown and described with reference to an exemplary embodiment thereof, it will be understood by those skilled in the art that various changes in form and details may be made therein without departing from the spirit and scope of this invention as defined by the appended claims.

The invention claimed is:

1. A terminal for providing a notification, the terminal comprising:
   a display;
   a transceiver configured to communicate with a server; and
   a controller coupled with the transceiver and configured to:
      control the display to display an user interface for receiving an user input,
      acquire information for the notification based on the user interface, the information for the notification including information on a location and one of an arrival of a target device at the location or a departure of the target device from the location,
      transmit, to the server, a message to request information related to the target device based on the information for the notification,
      receive, from the server, the information related to the target device, and
      generate if the information related to the target device corresponds to the one of the arrival of the target device at the location or the departure of the target device from the location, a control signal for the notification.

2. The terminal of claim 1, wherein the information related to the target device is received during a duration corresponding to configuration information of the target device.

3. The terminal of claim 2, wherein the configuration information of the target device is set via a user input of the target device.

4. The terminal of claim 1, wherein the information related to the target device is received if the target device is set to provide information of the target device.

5. The terminal of claim 1, further comprising:
   a display unit configured to display the notification associated with one of the arrival of the target device at the location or the departure of the target device from the location.

6. A method for providing a notification by a terminal, the method comprising:
   displaying a user interface for receiving a user input;
   acquiring information for the notification based on the user interface, the information for the notification including information on a location and one of an arrival of a target device at the location or a departure of the target device from the location;

transmitting, to a server, a message to request information related to the target device based on the information for requesting the notification;

receiving, from the server, the information related to the target device; and generating, by the terminal, if the information related to the target device corresponds to the one of the arrival of the target device at the location or the departure of the target device from the location, a control signal for the notification.

7. The method of claim 6, wherein the information related to the target device is received during a duration corresponding to configuration information of the target device.

8. The method of claim 7, wherein the configuration information of the target device is set via a user input of the target device.

9. The method of claim 6, wherein receiving the information related to the target device comprises receiving the information related to the target device if the target device is set to provide information of the target device.

10. The method of claim 6, further comprising displaying the notification associated with one of the arrival of the target device at the location or the departure of the target device from the location.

11. A terminal for providing a notification, the terminal comprising:
a display;
a transceiver configured to communicate with a server; and
a controller coupled with the transceiver and configured to:
control the display to display a user interface for receiving a user input,
acquire information for the notification based on the user interface, the information for the notification including information on a location and one of an arrival of a target device at the location or a departure of the target device from the location,
transmit, to the server, a message to request information on the location of the target device,
identify whether the information on the location of the target device is received from the server, and
generate, if the information on the location of the target device is received from the server, a control signal for the notification, at the terminal, associated with one of the arrival of the target device at the location or the departure of the target device from the location based on the information for the notification and the information on the location of the target device.

12. The terminal of claim 11, wherein the information on the location of the target device is received during a duration corresponding to configuration information of the target device.

13. The terminal of claim 12, wherein the configuration information of the target device is set via a user input of the target device.

14. The terminal of claim 11, wherein the controller is further configured to control the transceiver to receive the information on the location of the target device if the target device is set to provide information of the target device.

15. The terminal of claim 11, further comprising:
a display unit configured to display the notification associated with one of the arrival of the target device at the location or the departure of the target device from the location.

16. A method for providing a notification by a terminal in a communication system, the method comprising:
displaying a user interface for receiving a user input;
acquiring information for the notification based on the user interface, the information for the notification including information on a location and one of an arrival of a target device at the location or a departure of the target device from the location;
transmitting, to a server, a message to request information on the location of the target device;
identifying whether information on the location of the target device is received from the server; and
generating, if the information on the location of the target device is received from the server, a control signal for the notification, at the terminal, associated with one of the arrival of the target device at the location or the departure of the target device from the location based on the information for the notification and the information on the location of the target device.

17. The method of claim 16, wherein the information on the location of the target device is received during a duration corresponding to configuration information of the target device.

18. The method of claim 17, wherein the configuration information of the target device is set via a user input of the target device.

19. The method of claim 16, wherein receiving the information on the location of the target device comprises:
receiving the information on the location of the target device if the target device is set to provide information of the target device.

20. The method of claim 16, wherein further comprising:
displaying the notification associated with one of the arrival of the target device at the location or the departure of the target device from the location.

* * * * *